United States Patent [19]

Hagqvist et al.

[11] Patent Number: 5,401,395
[45] Date of Patent: Mar. 28, 1995

[54] VALVE ARRANGEMENT FOR A PRESSURIZED WATER PURIFIER

[75] Inventors: Peter Hagqvist, Älvsjö ; Per Fonser, Stockholm; Fredrik Dellby, Enskede, all of Sweden

[73] Assignee: AB Electrolux, Stockholm, Sweden

[21] Appl. No.: 59,933

[22] Filed: May 11, 1993

[30] Foreign Application Priority Data

May 13, 1992 [SE] Sweden .................. 9201513

[51] Int. Cl.⁶ .................. B01D 35/147
[52] U.S. Cl. .................. 210/106; 210/130; 210/194; 210/321.69; 210/433.1
[58] Field of Search ............ 210/106, 130, 136, 194, 210/321.69, 418, 433.1

[56] References Cited

U.S. PATENT DOCUMENTS

| | | | |
|---|---|---|---|
| 2,865,442 | 12/1958 | Halford et al. | 210/106 |
| 3,389,796 | 6/1968 | Fiala et al. | 210/130 |
| 4,026,800 | 5/1977 | Friedrich et al. | 210/130 |
| 4,372,859 | 2/1983 | Sugimoto et al. | 210/106 |
| 4,963,253 | 10/1990 | Yen | 210/433.1 |
| 4,971,689 | 11/1990 | Burrows | 210/130 |

FOREIGN PATENT DOCUMENTS 3719292  6/1987  Germany .................. C02F 1/44

Primary Examiner—Sun Uk Kim
Assistant Examiner—W. L. Walker
Attorney, Agent, or Firm—Cushman Darby & Cushman

[57] ABSTRACT

It is proposed, in accordance with the invention, that a pressurized water purifier which includes an inlet conduit, a pressure-elevating pump mounted in the inlet conduit, a filter or membrane type purifying unit, a purified-water outlet conduit and a reject conduit for concentrated contaminated water that the reject conduit (22) includes a pressure-limiting valve (28) which is controlled by the pressure in the outlet conduit (18). This will enable the water purifier to operate at a required, high internal working pressure, while enabling the pressure of the purified water to be maintained at a maximum level limited by the water conduit system and to be varied in response to the water taken from the system in the absence of pulsations.

5 Claims, 2 Drawing Sheets

VALVE ARRANGEMENT FOR A PRESSURIZED WATER PURIFIER

BACKGROUND OF THE INVENTION

The present invention relates to a valve arrangement for a pressurized water purifier of the kind which comprises an inlet conduit, a pressure-elevating pump incorporated in the inlet conduit, a filter or membrane type purifying unit, a purified-water outlet conduit, and a reject conduit for concentrated non-purified or contaminated water.

A problem with known pressurized water purifiers resides in the difficulty of achieving a uniform or non-pulsating output flow of purified water independently of the size of the flow. This problem is associated with the fact that in order to overcome the filter or membrane counterpressure, it is necessary for water purifiers of this type to operate at an internal pressure greater than 1 MPa, this pressure of 1 MPa being the maximum pressure for which a domestic water system in which the water purifier is installed is normally constructed.

SUMMARY OF THE INVENTION

An object of the present invention is to provide a valve arrangement of the aforesaid kind which will enable, with the aid of simple control/technical means, the water purifier to deliver a purified water flow which even in a part-load region will never exceed 1 MPa, while ensuring, at the same time, that the flow exiting from the water purifier will be as smooth as possible, with minimum pulsation.

According to one aspect of the invention, there is incorporated in the reject conduit a pressure-limiting valve which is controlled by the pressure occurrent in the outlet conduit. By causing the pressure in the purifying system to vary in this way in accordance with the pressure in the outlet conduit, as the pressure in the outlet conduit is raised when a small quantity of water is taken from the system, the pressure of the water which passes through the purifying unit will decrease. In the opposite case, i.e. when the pressure in the outlet conduit decreases as large quantities of purified water are taken from the system, the system pressure upstream of the pressure-limiting valve is increased so that the pressure drop across the purifying unit and therewith the outflow of the purified water will increase as a result thereof.

In other words, the system is controlled positively, so that the flow of purified water is able to follow the changes in the extent to which a tap valve in the outlet conduit is opened. Because the pressure of the water purifier is controlled through the agency of the reject flow pressure, it is not necessary to control the flow generated by the high-pressure pump, and this flow can be driven by an inexpensive, constant speed electric motor, such as an induction motor.

Other features of the invention and advantages afforded thereby will be evident from the detailed description of the invention.

BRIEF DESCRIPTION OF THE DRAWINGS

The invention will now be described in more detail with reference to exemplifying embodiments thereof and also with reference to the accompanying drawings, in which.

DETAILED DESCRIPTION

Figure 1:
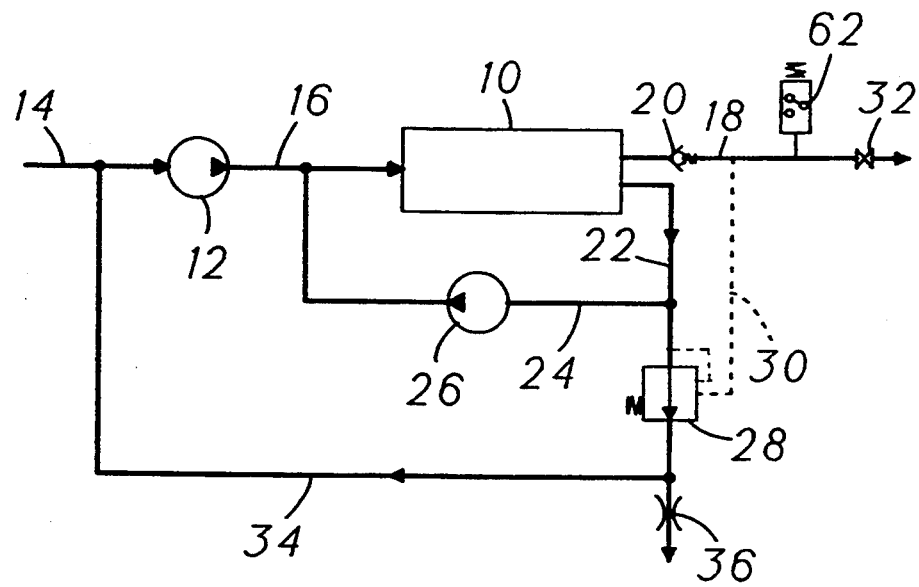
FIG. 1 is a simplified block schematic which illustrates a water purifier provided with a valve arrangement in accordance with principles of the present invention.

In the FIG. 1 embodiment, water to be purified is passed to a purifying or filtering unit 10 through an inlet pipe 14, a high-pressure pump 12 and a pressure line 16. Extending from the filtering unit 10 is an outlet conduit 18 for purified water and an outlet conduit 32 for the rejected or contaminated water which has passed through the filtering unit. The high-pressure pump 12 is conveniently a displacement pump, a lamella pump, which is able to handle a water flow that is substantially proportional to the speed of the pump.

The filter unit 10 is of a known kind and may include either a semi-permeable membrane which functions in accordance with the reverse osmosis principle, or a manofilter or an ultrafilter type, as desired. Such a filter unit 10 will normally include an essentially tubular separator unit (not shown) having a membrane or filter supporting structure. Water to be purified is streamed or flushed past the outer surface of the unit under overpressure, so that some of the water will be pressed through the unit and into its tubular interior and transported therefrom as purified water. In order to maintain the lowest possible pressure drop across the filter unit, with the intention of reducing the energy cost of the requisite pump work, it is endeavoured to maintain a low concentration of the loose or particulate contaminants on the outer surface of the membrane or the filters, these impurities otherwise tending to collect on said surfaces and therewith increase the pressure drop across the filter, by virtue of increased osmotic counterpressure or clogging of the filters. As previously mentioned, it is known to return a part of the pressurized non-filtered water, or reject, to the filter unit so as to continuously rinse the unit clean of impurities.

One such rinsing circuit is included in the FIG. 1 embodiment and comprises a return conduit 24 which branches from the outlet conduit 18 and which incorporates a centrifugal-type circulation pump 26, for instance a side-channel pump, having a large flow which may be at least five times greater, and preferably more than ten times greater than the flow delivered by the high-pressure pump 12. The water circulating in the return line 24 is intended to be held at a high pressure generated by the high-pressure pump 12, this pressure being determined by a pressure-limiting valve 28 incorporated in the return line downstream of the outlet conduit 22, in accordance with the invention.

The pressure-limiting valve 28 is controlled through the agency of a control line 30 in response to the pressure occurrent in the purified water outlet conduit 18. In turn, this pressure is determined by the pressure drop across the purified-water tapping valve, or tap, 32, so that when the tap valve 32 is opened to a small extent, the pressure-limiting valve 28 will allow more reject to pass to the return conduit 34, so that the high pressure prevailing in the return conduit 24 will not rise above a predetermined level. The pressure-limiting valve 28 is suitably of the kind with which the inlet pressure is limited by a spring force in combination with the pressure in the control conduit 30. The pressure-limiting valve 28 is preferably also dimensioned so as to constantly allow a minimum flow to pass through the valve when the water purifier is in operation, i.e. when the high-pressure pump 12 is running. this will completely avoid the occurrence of valve knocks (hammering) and pressure surges when manipulating the tap valve 32.

Figure 3:
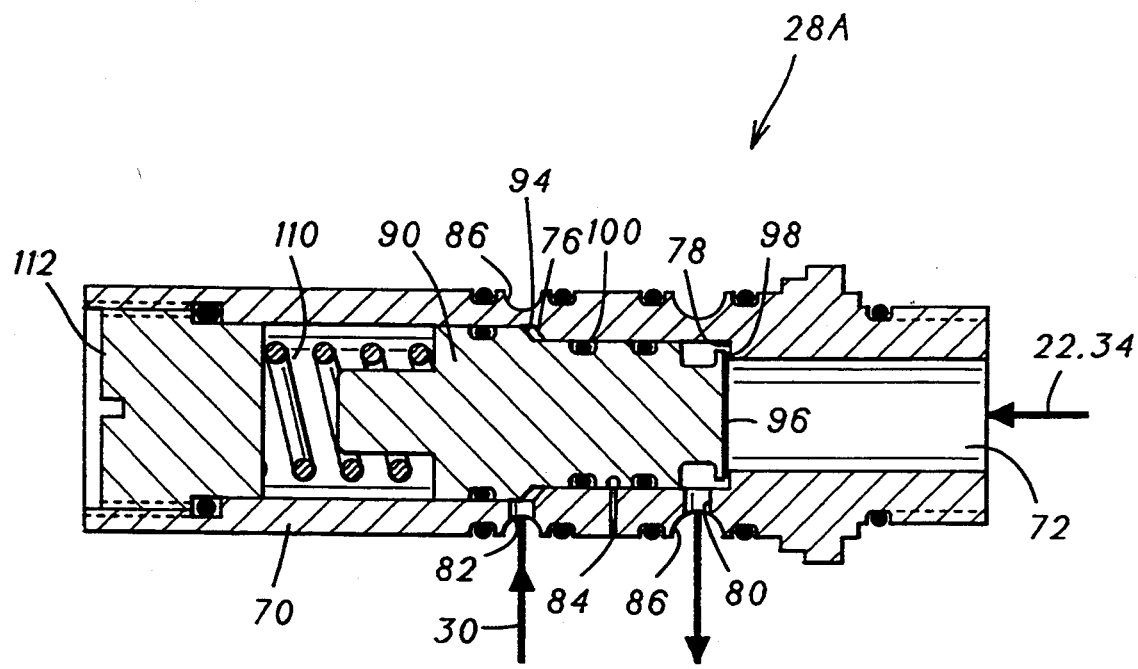
FIGS. 3 and 4 are respectively cross-sectional views of two pressure-limiting valves, in accordance with the invention.
Figure 4:
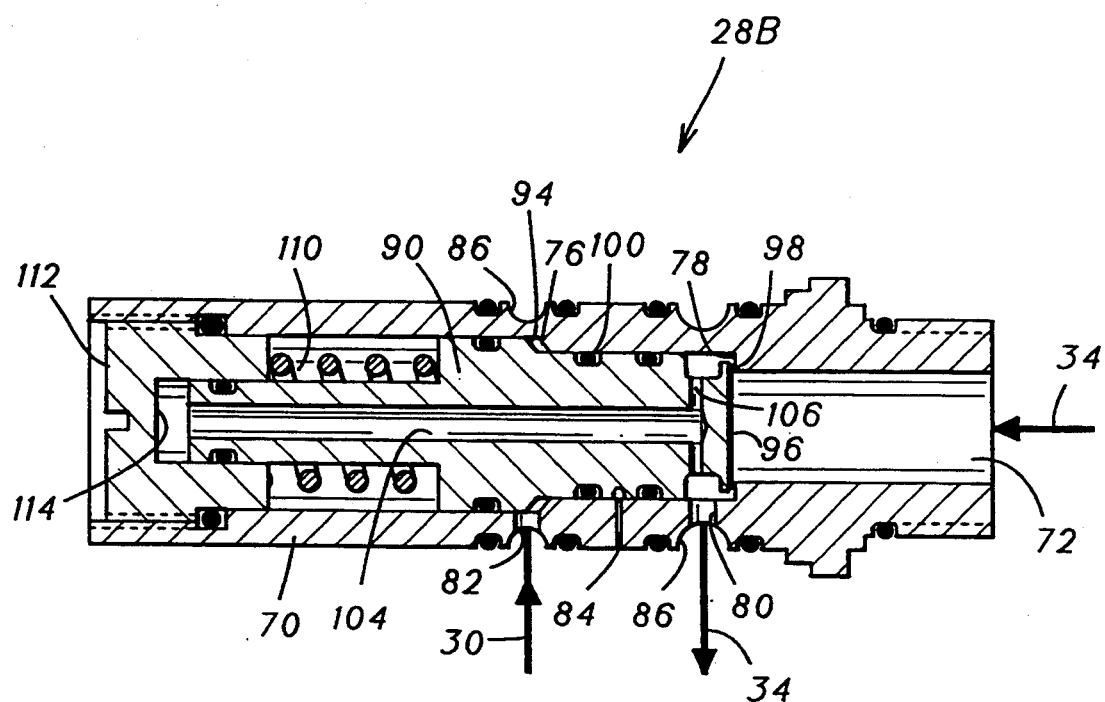

FIGS. 3 and 4 illustrate respectively two constructive exemplifying embodiments of the inventive pressure-limiting valve 28, here reference generally 28A and 28B.

Figure 2:
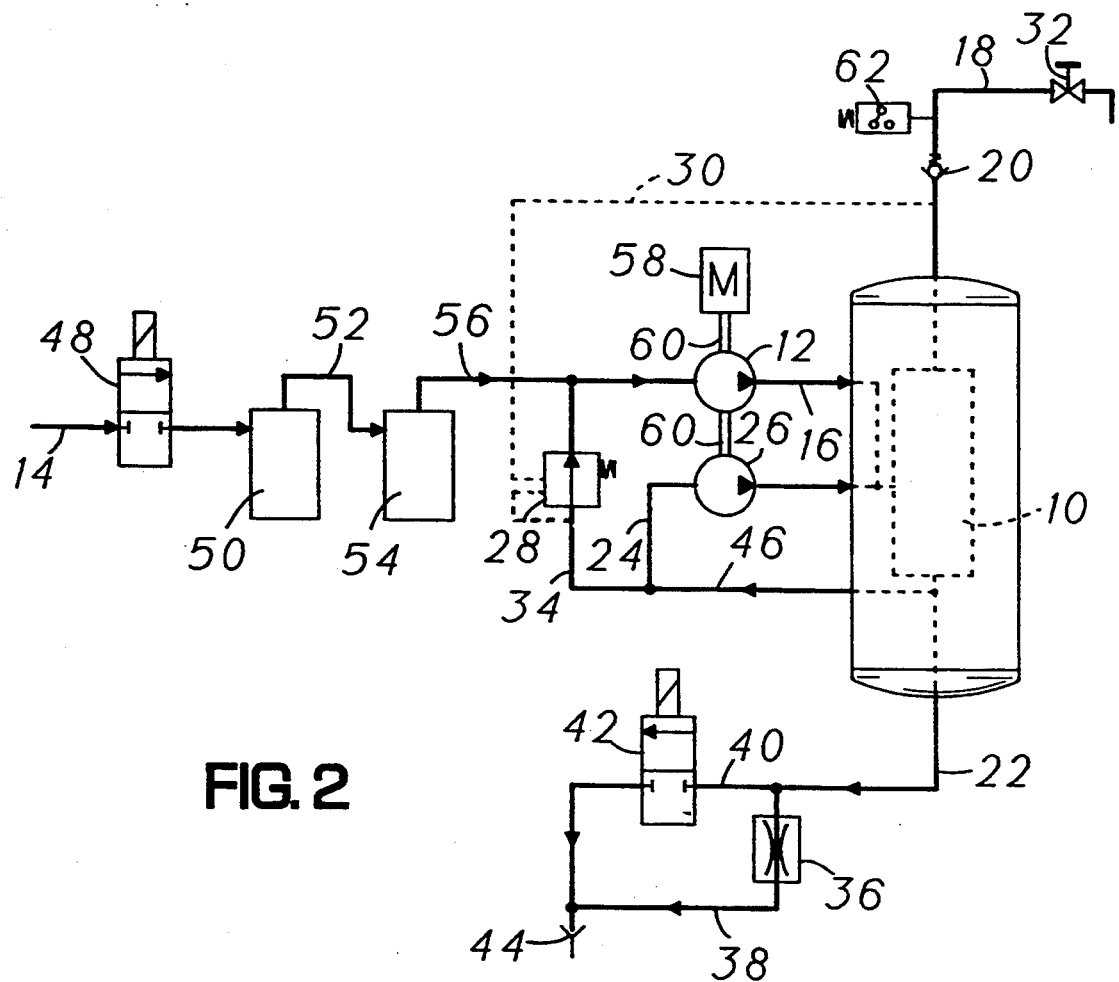
FIG. 2 illustrates schematically and in more detail a modified embodiment of a water purifier provided with a valve arrangement in accordance with principles of the present invention.

The valve 28A illustrated in FIG. 3 includes a generally cylindrical valve housing 70 which includes an inlet channel 72 for connection to the conduit 22 of the FIG. 1 illustration or the conduit 34 of the FIG. 2 illustration. Extending from the opposite side of the valve housing 70 is a bore 74 which accommodates a valve body 90 which is biassed by a helical spring 110 against a seating 78 in the valve housing 70, said spring being mounted in the valve housing 70 by means of a setting screw 112. The seating-side of the valve body 90 is provided with a rubber sealing plate 96 having a circular sealing bead 98 extending around the outer periphery thereof. The valve housing 70 also includes a diameter-reducing shoulder 76 which coacts with a corresponding shoulder 94 on the valve body 90. Also provided in the valve housing 70 are two radial bores 80 and 82, of which one bore, 80, forms the valve outlet opening, whereas the other bore, 82, is intended for connection with the water-purifier control conduit 30. The bore opening, 82, is intended to introduce the control pressure between the shoulders 76 and 94 so as to exert an opening force on the valve body and therewith amplify the opening force exerted by the pressure in the valve inlet channel 72. The bores openings 80 and 82 are intended for connection with associated conduits by means of banjo-couplings, not shown. To this end, peripheral grooves 86, 86 are provided on the outer surface of the valve housing 70 in the vicinity of respective bore openings 80, 82. The valve body is sealed in the housing by means of O-rings 100. A drainage channel 84 which communicates with a ring groove in the valve body between two O-ring seals 100 is formed in the valve housing 70 between the bore openings 80 and 82. The drainage channel 84 is intended to ensure satisfactory sealing of the O-rings by one-sided pressure application, and to prevent the reject flow passing through the valve from mixing with the purified control-pressure fluid.

The pressure-limiting valve 28B of FIG. 4 differs from the valve 28A of FIG. 3 in that the valve body 90 includes pressure equalizing channels 104, 106 which are active in compensating or hydraulically force-balancing the valve body 90 against the pressure in the outlet opening 80, since this pressure can be delivered to a space 114 within the setting screw 112 and there act on the rear side of the valve body 90 so as to pressure-balance the valve body. The control pressure required in the control conduit 30 is therewith independent of the pressure in the outlet bore 80. The embodiment illustrated in FIG. 4 is particularly beneficial when the pressure-limiting valve is coupled in a pressurized return conduit 34, as in the case of the embodiment illustrated in FIG. 2, which will be described below.

The purified-water outlet conduit 18 may also include a check valve 20 which, when the tap valve 32 is closed, maintains the control pressure in the conduit leading to the pressure-limiting valve 28 when the high-pressure pump 12 is shut down.

In the case of the illustrated embodiment, a second return conduit 34 branches from the outlet conduit 22 at a location downstream of the pressure-limiting valve 28. This second return conduit returns to the inlet conduit 14 part of the flow that passes through the pressure-limiting valve, i.e. to a point upstream of the high-pressure pump 12. That part of the contaminated water which constantly leaves the system to a waste outlet therewith passes through a constriction or a constant flow valve 36. However, it lies within the concept of the invention to allow all reject flow to pass to a waste outlet without branching the flow to a return conduit 24 and 34 (although not shown).

Thus, by sensing the pressure of the water purifier at the system tapping point and regulating the pressure at the reject flow, the pressure of the water purifier can be caused to follow the variations in the outtake of purified water in a technically simple controlled fashion.

Furthermore, there is achieved with the aforedescribed arrangement of the double return conduits 24, 35 a circulation flow of high pressure and of large, essentially constant flow, and a circulation flow of low pressure which can be permitted to vary in response to the purified water outtake. This enables not only the circulation pump 26 to be operated at a constant speed but also the high-pressure pump 12, so that the pumps can be driven by inexpensive alternating current motors, for instance induction motors.

Also arranged in the outlet conduit 18 is a pressure switch 62 which is intended to start-up the water purifier through the agency of an electronic control circuit (not shown), i.e. to start-up the pump 12 when the conduit pressure in the vicinity of the tap has fallen beneath a predetermined value, e.g. a value of 0.3 MPa, and to shut-down the water purifier when the pressure has reached another, preset value, e.g. a value of 0.7 MPa.

The pressure-limiting valve 28 maintains the system pressure at a level which is preferably higher than 1 MPa, e.g. 1.5 MPa. The pressure-limiting valve 28 is preferably constructed so that the system pressure will be maximum, for instance 1.5 MPa, at maximum flow through the water purifier, i.e. when the pressure in the outlet conduit 18 approaches zero, and so as to lie slightly above the pressure in the outlet conduit 18 when the flow is low, i.e. when the pressure in the outlet conduit 18 is equal to the shut-off pressure, e.g. 0.7 MPa. The system pressure is thus caused to follow the variations in the water outtake through the conduit 18.

As an extra safety measure against high pressure, the various pressure levels in the pressure-limiting valve can be defused with drainage holes (not shown).

The inventive valve arrangement is particularly suitable for use in water purifiers which operate in accordance with the reverse osmosis principle. A water purifier of this kind can require an overpressure of about 1.5 MPa to overcome the osmotic counterpressure in the semi-permeable membrane. However, the pressure which reaches the water conduit system can be restricted to about 0.7 MPa by the pressure-limiting valve mounted in the reject conduit, so as not to exceed the normal water conduit pressure.

In principle, the exemplifying embodiment illustrated in FIG. 2 differs from the FIG. 1 embodiment mainly in that the pressure-limiting valve 28 is placed in the return conduit for the returned variable rejected flow, instead of in the outlet conduit between the two return conduits of the FIG. 1 embodiment. In this case, the outlet conduit for contaminated water is divided within the filter unit 10 into a return conduit 46 and a reject conduit 22, this division being shown only schematically. The reject conduit 22 extends to an outlet 44 through the constriction or constant flow valve 36 and is also provided with a shunt 40 which incorporates a magnetically controlled rinsing valve 42. The rinsing valve 42 is normally closed, but can be opened by means of a control unit (not shown) when the filter unit requires additional cleaning.

The other branch 46 of the outlet conduit, which is under high pressure in this case, is branched to the circulation conduit 24 with the pump 26 and also to a first high-pressure part of the second return conduit 34, which is terminated in the pressure-limiting valve 28, downstream of which the pressure-limited return flow is returned to an inlet conduit 56 where it is mixed with newly arriving water and then passed to the high-pressure pump 12.

The valve arrangement of the present invention enables the pumps to work at a constant speed and, when suitably dimensioned, also to be driven by a common motor 58 via a common shaft 60, 60, as illustrated in FIG. 2. This will enable a simple construction to be obtained at low costs.

In the FIG. 2 embodiment, the inlet conduit 14 for water to be purified also incorporates an inlet valve 48 and two filter houses 50 and 54 which are mutually connected in series by means of a conduit 52. A first filter house, 50, may contain a particle filter, and the other filter house, 54, an active carbon filter for preparatory cleansing of the incoming water.

We claim:

1. A pressurized water purifier, comprising:
an inlet conduit including a pressure elevating pump;
a filter or membrane-type purifying unit, said purifying unit being adapted for receiving pressurized water to be purified from said inlet conduit and for purifying said pressurized water;
a purified water outlet conduit for supplying pressurized purified water from the purifying unit; and
a reject conduit for supplying reject water from the purifying unit, said reject conduit including a pressure-limiting valve externally controlled by the pressure of the pressurized purified water in said purified water outlet conduit to increase the pressure in the water purifier and the purified water outlet conduit in response to a decreasing pressure to the purified water outlet conduit and to decrease the pressure in the water purifier and the purified water outlet conduit in response to an increasing pressure in the purified water outlet conduit;
the pressure-limiting valve comprising a valve housing which includes a valve body which can be moved in a valve-opening direction by the pressures that prevail in the reject conduit and the purified water outlet conduit, against the action of a spring; said valve housing having an inlet from said reject conduit located effectively upstream of said valve body, and an outlet to said reject conduit located effectively downstream of said valve body.

2. The pressurized water purifier according to claim 2, wherein:
the valve body is constructed so as to be hydraulically force-balanced against its displacement in response to pressure acting on the outlet of the pressure limiting valve.

3. The pressurized water purifier according to claim 1 including:
a check valve which functions to maintain the pressure in the purified water outlet conduit when a motor which drives the pressure-elevating pump is shut-down.

4. The pressurized water purifier according to claim 1, wherein:
the pressure limiting valve is mounted in a return conduit branch of said reject conduit which extends to said inlet conduit.

5. A pressurized water purifier, comprising:
an inlet conduit including a pressure elevating pump;
a filter or membrane-type purifying unit, said purifying unit being adapted for receiving pressurized water to be purified from said inlet conduit and for purifying said pressurized water;
a purified water outlet conduit for supplying pressurized purified water from the purifying unit; and
a reject conduit for supplying reject water from the purifying unit, said reject conduit including a pressure-limiting valve externally controlled by the pressure of the pressurized purified water in said purified water outlet conduit to increase the pressure in the water purifier and the purified water outlet conduit in response to a decreasing pressure to the purified water outlet conduit and to decrease the pressure in the water purifier and the purified water outlet conduit in response to an increasing pressure in the purified water outlet conduit;
a pressure switch in the purified water outlet conduit, said switch functioning to control the starting and stopping of a motor which drives the pressure-elevating pump.

* * * * *